(12) United States Patent
Ritter et al.

(10) Patent No.: US 9,579,598 B2
(45) Date of Patent: Feb. 28, 2017

(54) PRESSURE SWING ADSORPTION PROCESS FOR ENHANCED SEPARATION OF LIGHTER FROM HEAVIER SPECIES

(71) Applicant: APACHE CORPORATION, Houston, TX (US)

(72) Inventors: James A. Ritter, Gilbert, SC (US); Armin D. Ebner, Lexington, SC (US); Jason G. S. Ho, Houston, TX (US)

(73) Assignee: Apache Corporation, Houston, TX (US)

( * ) Notice: Subject to any disclaimer, the term of this patent is extended or adjusted under 35 U.S.C. 154(b) by 0 days.

(21) Appl. No.: 15/153,917

(22) Filed: May 13, 2016

(65) Prior Publication Data

US 2016/0271554 A1 Sep. 22, 2016

Related U.S. Application Data

(60) Provisional application No. 62/161,936, filed on May 15, 2015.

(51) Int. Cl.
*B01D 53/047* (2006.01)
*B01D 53/053* (2006.01)

(52) U.S. Cl.
CPC ......... *B01D 53/047* (2013.01); *B01D 53/053* (2013.01); *B01D 2259/403* (2013.01);
(Continued)

(58) Field of Classification Search
CPC ............... B01D 53/047; B01D 53/053; B01D 2259/4003; B01D 2259/4041;
(Continued)

(56) References Cited

U.S. PATENT DOCUMENTS 3,788,036 A 1/1974 Lee et al.
4,263,018 A * 4/1981 McCombs ........... B01D 53/047
                                                    95/19
(Continued)

FOREIGN PATENT DOCUMENTS

EP 0753334 1/1997
EP 0705636 4/1999

OTHER PUBLICATIONS

Ebner, Armin D., et al; "Graphical approach for complex PSA cycle scheduling" Adsorption (2009) 15, pp. 406-421.
(Continued)

*Primary Examiner* — Frank Lawrence
(74) *Attorney, Agent, or Firm* — Bracewell LLP; Constance G. Rhebergen; Vivek Shankam

(57) ABSTRACT

A pressure swing adsorption (PSA) system and a PSA process including a PSA cycle schedule are disclosed. The PSA cycle schedule includes an unlimited number of equalization steps, no idle steps, no dead time and a minimum number of three PSA adsorbent beds assisted with two or more equalization tanks. The PSA system, process and cycle schedule include the following sequence of cycle steps: a feed step, two or more down equalization steps either between beds or between a bed and a tank, an optional forced cocurrent depressurization step coupled with a forced intermediary light end pressurization step, a countercurrent depressurization step, a light reflux step, two or more up equalization steps between beds or between a bed and a tank, an optional forced intermediary light end pressurization step coupled with the forced cocurrent depressurization step, and a light product pressurization step.

20 Claims, 8 Drawing Sheets

(52) U.S. Cl.
CPC ............... *B01D 2259/4003* (2013.01); *B01D 2259/404* (2013.01); *B01D 2259/40041* (2013.01); *B01D 2259/40075* (2013.01); *B01D 2259/40079* (2013.01); *B01D 2259/40081* (2013.01)

(58) Field of Classification Search
CPC .. B01D 2259/4039; B01D 2259/40075; B01D 2259/40079; B01D 2259/40081; B01D 2259/403; B01D 2259/404
USPC ........................................ 95/96, 103; 96/121
See application file for complete search history.

(56) References Cited

U.S. PATENT DOCUMENTS

| | | | |
|---|---|---|---|
| 4,340,398 A | 7/1982 | Doshi et al. | |
| 4,468,237 A | 8/1984 | Fuderer | |
| 4,816,039 A * | 3/1989 | Krishnamurthy | B01D 53/0476 95/103 |
| 5,536,300 A | 7/1996 | Reinhold, III et al. | |
| 5,565,018 A | 10/1996 | Baksh et al. | |
| 6,007,606 A * | 12/1999 | Baksh | B01D 53/053 95/101 |
| 6,048,384 A * | 4/2000 | Smolarek | B01D 53/0476 95/101 |
| 6,171,371 B1 * | 1/2001 | Derive | B01D 53/0473 95/100 |
| 6,454,838 B1 | 9/2002 | Xu et al. | |
| 6,503,299 B2 | 1/2003 | Baksh et al. | |
| 7,749,687 B2 | 7/2010 | Nakamura | |
| 7,763,100 B2 | 7/2010 | Baksh et al. | |
| 2013/0327216 A1 * | 12/2013 | Deckman | B01D 53/0473 95/96 |

OTHER PUBLICATIONS

Mehrotra, Amal, et al.; "Arithmetic approach for complex PSA cycle schduling" Adsorption (2010) 16, pp. 113-126.

Mehrotra, Amal, et al.; "Simplified graphical approach for complex PSA cycle scheduling" Adsorption (2011) 17, pp. 337-345.

Ebner, Armin D., et al; "Graphical unit block approach for complex PSA cycle scheduling of parallel interacting trains of columns and tanks" Adsorption (2015) 21, pp. 229-241.

* cited by examiner

PRESSURE SWING ADSORPTION PROCESS FOR ENHANCED SEPARATION OF LIGHTER FROM HEAVIER SPECIES

CROSS-REFERENCE TO RELATED APPLICATIONS

The present application is a non-provisional application which claims priority to and the benefit of U.S. Provisional Application No. 62/161,936, filed on May 15, 2015 and titled "Pressure Swing Adsorption Process and System for Enhanced Separation of Lighter from Heavier Species," the disclosure of which is incorporated herein in its entirety.

BACKGROUND

Field of the Invention

Example embodiments relate to a pressure swing adsorption (PSA) system and process designed for recovering and concentrating the heavier species from a feed gas stream also containing lighter species, or recovering and concentrating the lighter species from a feed gas stream also containing heavier species, or recovering and concentrating both the heavier and lighter species from a feed gas stream containing such heavier and lighter species. More specifically, example embodiments relate to systems and methods for enhanced separation of lighter from heavier species.

Description of Prior Art

A PSA process is generally used for the purification and recovery of a light gas species from a gas mixture wherein the rest of the gas species have either a stronger thermodynamic affinity or faster adsorption kinetics with the adsorbent or layers of adsorbents being utilized in the process. In these processes the light product stream containing the lighter species leaves the beds at the same pressure of the feed stream, while the rejected heavy product stream leaves the beds at the lowest pressure of the PSA cycle. Examples of processes utilized in this way are the purification of hydrogen from reforming gas, the concentration of oxygen from air, the concentration and purification of methane from nitrogen, and the purification of ethanol from water at elevated temperatures.

Less commonly, PSA is also used for the concentration and recovery of a heavy gas species from a gas stream wherein the rest of the species have either less thermodynamic affinity or slower adsorption kinetics with the adsorbent or layers of adsorbents being utilized in the process. In these processes the heavy product stream containing the heavy species leaves the beds at the lowest pressure of the PSA cycle while the rejected light product stream leaves the beds at the same pressure of the feed stream. Examples of processes utilized in this way are the separation of carbon dioxide from flue gas, the removal of carbon dioxide from the tail gas of a PSA process for hydrogen purification, the purification of oxygen from a stream containing nitrogen and oxygen impurities, the purification of nitrogen from air, and the purification of methane from a stream containing nitrogen as impurity.

SUMMARY

A PSA process aimed at the recovery of the lighter species in the light product stream is significantly improved if it is also designed to simultaneously enrich the heavier species in the heavy product stream. Sometimes, a higher enrichment of the heavier species in the heavy product stream leads to higher recoveries of the lighter species in the light product stream. The enrichment of the heavier species in the heavy product stream, and hence the recovery of the lighter species in the light product stream, also increases by decreasing the pressure within the bed during the PSA cycle using PSA cycle steps that are particularly designed for this purpose.

One such step is the equalization step, in which two adsorbent beds of the PSA process are connected at a given moment during the PSA cycle to equalize their own pressures to a common value. This is done sometime before the final depressurization of the bed and most commonly through the light ends of the beds. The content of the lighter species in the beds is reduced because the gas stream leaving the beds is comparably much richer in these species. Although it is desirable to have as many equalization steps as possible in a PSA cycle schedule, there are several disadvantages to doing so.

A major disadvantage of utilizing bed-to-bed equalization steps is that an additional bed is generally required for each additional equalization step thus resulting in significant cost associated with the bed and the additional amount of adsorbent it contains. In fact, the use of a minimum number of adsorbent beds is always desirable in a PSA process to maximize the feed throughput or productivity. Another disadvantage of utilizing equalization steps is the possible requirement of idle steps to accommodate the desired number of equalization steps within the PSA cycle schedule. An idle step is a PSA cycle step wherein the bed has both ends closed and is thus not performing a useful gas separation function. Inadequate placement of the equalization steps within the PSA cycle schedule may also lead to PSA cycle schedules with significant dead time. Dead time is defined herein as the time remaining during a unit step within the PSA cycle schedule where one cycle step is waiting for a different cycle step to finish. In addition, inadequate placement of the equalization steps within the PSA cycle schedule may lead to PSA cycle schedules that unnecessarily limit the durations of certain cycle steps relative to other cycle steps. All of these situations limit the potential performance of the PSA process in terms of cost, productivity or throughput, and recovery and purity of the species of interest whether it is the heavier, lighter or both species.

An increase in the number of equalization steps without an increase in the number of adsorbent beds can be achieved with the assistance of empty tanks, that is, vessels that do not contain any adsorbent and that serve as transit vessels for the gas moving from one bed to another bed undergoing equalization. In this way the equalization of two beds does not have to occur simultaneously in time but rather through two equalization steps, i.e., between the first bed to a tank and then between this tank to the second bed at two different moments of the PSA cycle. Because of their particular role, these tanks are identified herein as equalization tanks. However, the location of equalization steps in the PSA cycle schedule, if not done adequately, may still lead to the existence of undesirable idle steps. Further, inadequate placement of equalization steps within the cycle schedule, whether they are bed-to-bed or bed-to-tank-to-bed, leads to designs that are quite inflexible as far as adjusting the durations of PSA steps is concerned, thus limiting their ability to improve performance in terms of process cost, as well as productivity, recovery and purity of the species of interest.

There are several articles that describe the use of one or more empty tanks in a PSA process for pressure equalization with a bed. For example, some references teach how to use one or more equalization tanks between just two beds so that an equalization step can be included in the PSA cycle schedule. Otherwise, for a continuous feed 2-bed PSA process it is not possible to include an equalization step.

For example, some references teach how to use one or more equalization tanks between more than two beds to increase the number of equalization steps in a PSA cycle schedule. In addition, some references teach how to include four equalization steps in a 6-bed PSA process with the inclusion of idle steps in one case and without the inclusion of idle steps in another case when an equalization tank is added.

Similarly, some references teach how to reduce the number of idle steps associated with the addition of equalization steps in a PSA cycle schedule by the addition of equalization tanks. Some references also teach how to systematically incorporate equalization tanks into a PSA cycle schedule and that the addition of equalization tanks can be used instead of the addition of beds to increase the number of equalization steps in a PSA cycle schedule by the same number.

Example embodiments teach how to formulate PSA cycle schedules in such a way that any number of equalization steps can be included in a PSA cycle schedule without having to include any idle steps and without having any dead time by utilizing equalization tanks and a minimum number of three adsorbent beds. This present invention also teaches how to implement a forced cocurrent depressurization PSA cycle step coupled to a forced intermediary repressurization PSA cycle step in a PSA cycle schedule to improve the process performance, and how to add an additional adsorbent bed to increase the duration of certain PSA cycle steps to also improve the process performance without affecting the duration of the feed step.

In one example embodiment, a forced cocurrent depressurization (CoD) step is coupled with a forced intermediary light end pressurization step. Some references show that a CoD step has been utilized to remove additional lighter gas species from a bed. The gas leaving a bed undergoing the CoD step is typically sent to a bed undergoing a light reflux (LR) step to provide the purge gas for that step. A CoD step is a depressurization step that reduces the pressure of a bed from some pressure that is above atmospheric pressure, sometimes substantially above atmospheric pressure, to some lower pressure that is still above atmospheric pressure, sometimes still substantially above atmospheric pressure. In another example embodiment, the system continues decreasing the pressure in one of these beds and continues increasing the pressure in another bed with the aid of compressor or vacuum pump to facilitate removing additional lighter gas species from a bed and recycling this gas to the other bed to partially pressurize it.

In another example embodiment, the addition of an adsorbent bed to a PSA cycle schedule is done for the sole purpose of increasing the duration of certain PSA cycle steps to improve the process performance without affecting the duration of the feed step. There may be two ways to increase the duration of a particular cycle step. First, the duration of a cycle step can be increased simply by making its duration longer but while also making the feed step duration longer such that their durations relative to each other do not change; but, this may not be desirable because it also decreases the durations of all the other cycle steps relative to the new feed step duration. Second, the duration of a cycle step can be increased, as taught in one embodiment of this invention, by adding an additional bed in such a way that the duration of certain cycle steps can be increased without increasing the duration of the feed step so their durations relative to each other change and in such a way that it facilitates further regeneration of a bed.

BRIEF DESCRIPTION OF THE DRAWINGS

These and other features, aspects, and advantages of the present disclosure will become better understood with regard to the following descriptions, claims, and accompanying drawings. It is to be noted, however, that the drawings illustrate only several embodiments of the disclosure and are therefore not to be considered limiting of the disclosure's scope as it can admit to other equally effective embodiments.

DETAILED DESCRIPTION

Example embodiments disclosed relate to systems and methods including PSA cycle schedules that improve performance by utilizing a reduced number of beds, i.e., a minimum of three beds, that utilize two or more empty tanks for equalizing pressure that may utilize forced and coupled cocurrent depressurization/repressurization PSA cycle steps, that do not require idle steps, and that eliminate any dead time. These various embodiments of PSA cycle schedules are applicable to the production of lighter gas species, heavier gas species or both gas species from gas mixtures of the same. Individually or together, when these various embodiments are implemented within a PSA cycle schedule they foster improvement in the PSA process performance in terms of gas species purity and recovery, productivity or throughput, and/or capital and operating costs.

So that the manner in which the features and advantages of the embodiments of the present disclosure, as well as others, which will become apparent, may be understood in more detail, a more particular description of the embodiments of the present disclosure briefly summarized previously may be had by reference to the embodiments thereof, which are illustrated in the appended drawings, which form a part of this specification. It is to be noted, however, that the drawings illustrate only various embodiments and are therefore not to be considered limiting of the present disclosure's scope, as it may include other effective embodiments as well.

Example embodiments above disclose PSA cycle schedules including any number of equalization steps without any idle steps and without any dead time by utilizing equalization tanks and a minimum number of three adsorbent beds. Example embodiments above also teach how to implement forced and coupled cocurrent depressurization/repressurization PSA cycle steps in a PSA cycle schedule to improve the process performance, and how to add additional adsorbent beds to increase the duration of certain PSA cycle steps to also improve the process performance without affecting the duration of the feed step. In embodiments described herein, the schedules are constructed such that both the feed and production of the light product stream containing the lighter species are continuous in time. Abbreviations and reference letters and numerals used to describe the figures throughout herein refer to similar components and steps.

Figure 1:
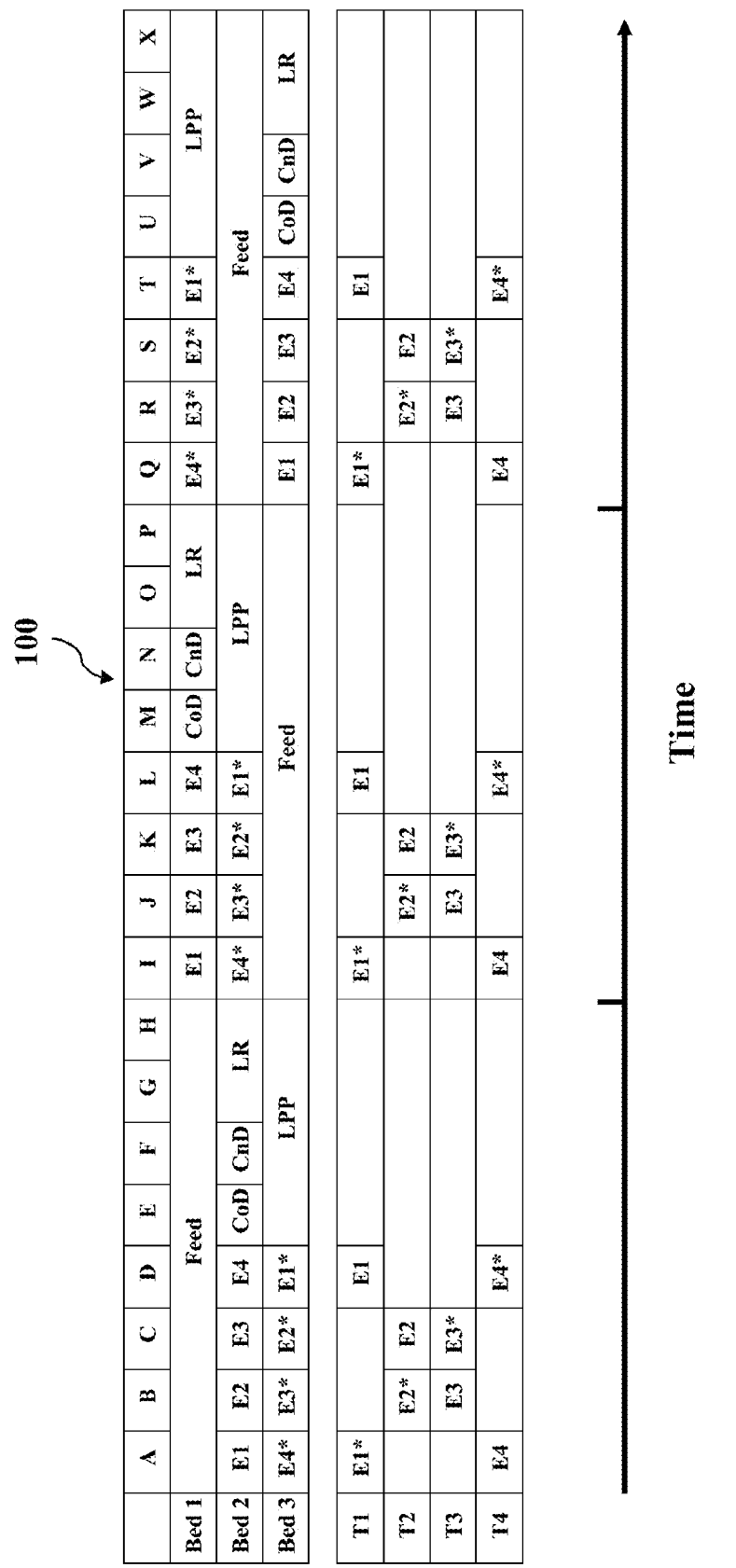
FIG. 1 is a schematic of an example 3-bed, 13-step, 4-tank continuous feed PSA cycle schedule with four light end equalization steps and no idle steps, according to one or more example embodiments.
Figure 2:
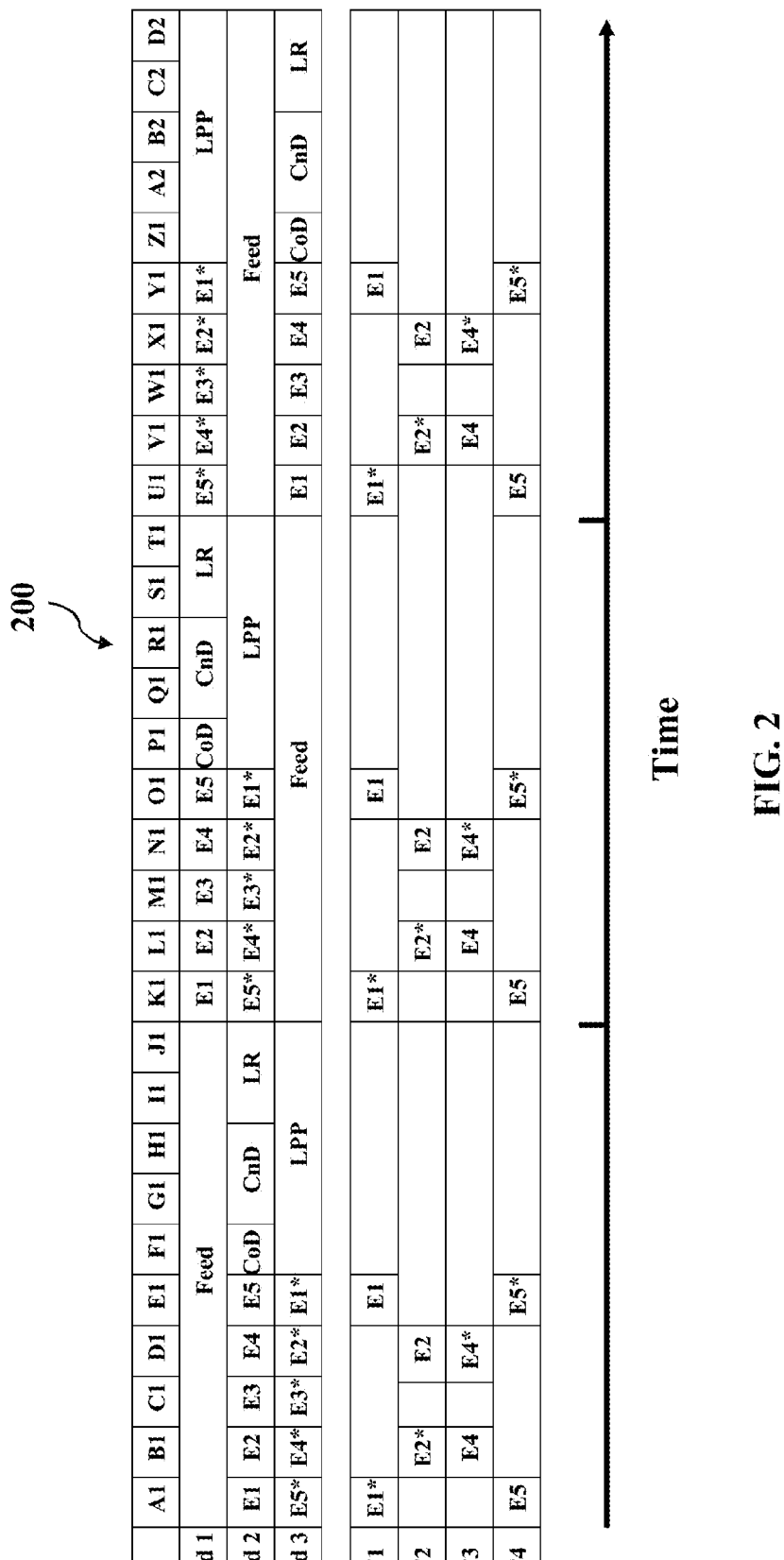
FIG. 2 is a schematic of an example 3-bed, 15-step, 4-tank continuous feed PSA cycle schedule with five light end equalization steps and no idle steps, according to one or more example embodiments.

Turning now to the figures, FIGS. 1 and 2 illustrate example PSA systems 100, 200 including example PSA cycle schedules having thirteen, and fifteen cycle steps, respectively, with three beds and four equalization tanks to handle four (FIG. 1) and five (FIG. 2) equalization steps and no idle steps, according to one or more example embodiments. The PSA cycle schedule in FIG. 2 shows that the number of equalization steps can be increased to five, with one bed-to-bed equalization step. Although seven vessels are required in both cases shown in FIGS. 1 and 2, only three of them contain an adsorbent, and four of them are just empty equalization tanks. Therefore, it is now possible to have five equalization steps with only three beds and no idle steps and no dead time with the proper utilization of equalization tanks.

This improvement in PSA cycle schedules is made possible by restricting the placement of all the equalization steps within the boxes of the PSA cycle schedule to be in sequence with no other cycle steps in between them, and by placing all the equalization steps in the left most boxes underneath the Bed 1 feed step (as shown in FIGS. 1 and 2) with no other cycle steps below them except other equalization steps and by adding equalization tanks as needed. This ensures an equalization step is not aligned with any other cycle step except other equalization steps, thereby affording additional degrees of freedom to the non-equalization cycle steps and eliminating any dead time associated with an equalization step waiting for a non-equalization step to finish. This new approach to creating PSA cycle schedules with any number of equalization steps, no idle steps, no dead time and requiring as few as three adsorbent beds is a novel and inventive feature of this example embodiment.

The PSA cycle step sequence in FIG. 1, Bed 1 includes the steps discussed as follows. First, a feed step, denoted by "Feed," is carried out at a constant, highest-available pressure of the PSA cycle, wherein a light product stream containing lighter species is produced at about the highest-available pressure of a PSA cycle.

Next, four consecutive light end down equalization steps, denoted by "$E_1$," "$E_2$," "$E_3$," and "$E_4$," are carried out from the light end to reduce the pressure of the bed and enrich it with heavier species. Next, a cocurrent depressurization step, denoted by "CoD," is carried out. Next, a countercurrent depressurization step, denoted by "CnD," is carried out, wherein gas is withdrawn from the feed end of the bed to constitute a heavy product while the pressure of the bed reaches the lowest pressure of the PSA cycle. Afterwards, a light reflux step, denoted by "LR," is carried out at a constant lowest-available pressure of the PSA cycle, wherein a small fraction of the light product stream containing the lighter species is fed into the light end of a bed to produce additional heavy product enriched in the heavier species.

Next, four consecutive light end up equalization steps, denoted by "$E_4^*$," "$E_3^*$," "$E_2^*$," and "$E_1^*$," are carried out through the light end that individually takes all the gas coming from the light end down equalizations steps, denoted by "$E_1$," "$E_2$," "$E_3$," and "$E_4$," taking first the gas coming from the last down equalization step $E_4$ and taking last the gas coming from the first down equalization step $E_1$, resulting in each case with a partial re-pressurization of the bed. Afterward, a light product pressurization step, denoted by "LPP," is carried out, wherein a small fraction of the light product stream containing the lighter species is fed into the light end of a bed to finalize the re-pressurization of the bed to the highest pressure prior to starting the feed step corresponding to the next cycle.

Figure 3:
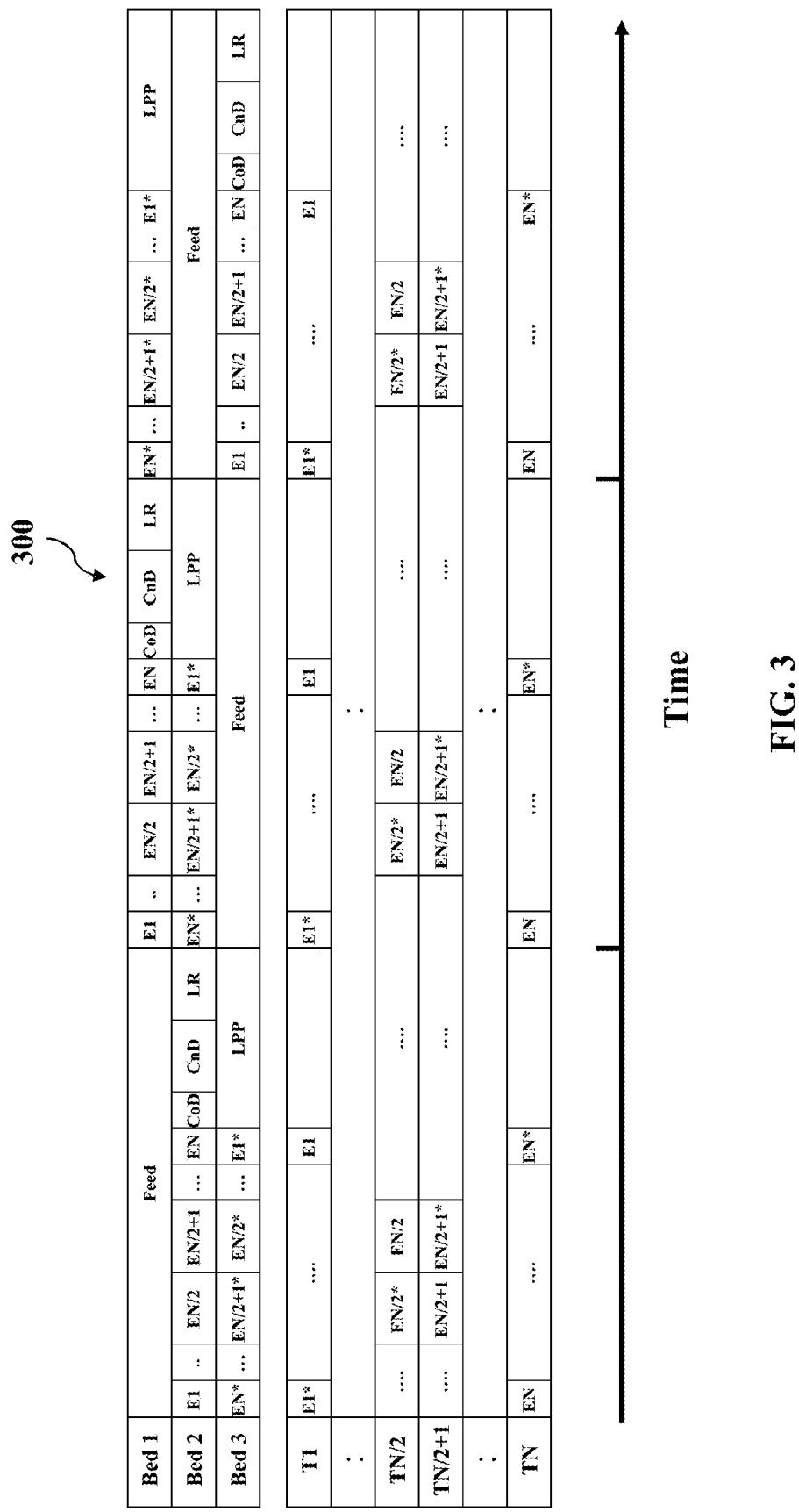
FIG. 3 is a schematic of an example 3-bed, (N+5)-step, N-tank continuous feed PSA cycle schedule with an unlimited even number (N=2, 4, 6, 8, . . . ) of light end equalization steps (N≥2) and no idle steps and no bed-to-bed equalization steps, according to one or more example embodiments.
Figure 4:
FIG. 4 is a schematic of an example 3-bed, (N+1+5)-step, (N)-tank continuous feed PSA cycle schedule with an unlimited odd number (N+1=3, 5, 7, 9, . . . ) of light end equalization steps (N+1≥3) and no idle steps and one bed-to-bed equalization step, according to one or more example embodiments.

FIGS. 3 and 4 generally show PSA systems 300, 400 including example PSA cycle schedules with an unlimited even or odd number of equalization steps, respectively. FIG. 3, for example, shows the case with an even number of equalization steps of two or greater that necessarily utilizes "N" tanks. FIG. 4 shows the case with an unlimited odd number of equalization steps "N+1", with N+1 =3, 5, 7, 9, . . . that necessarily still utilize N tanks but with one bed-to-bed equalization step which necessarily occurs directly in the middle of all of them with the same even number of them on either side of it, according to another example embodiment. It should be noted that in both of these 3-bed configurations the equalization steps do not interfere with any of the non-equalization steps affording the non-equalization steps additional degrees of freedom. It should also be noted how in these 3-bed configurations no idle steps are required even for an unlimited number of equalization steps. It should further be noted how in these 3-bed configurations dead time is completely eliminated.

One advantage of eliminating dead time via the proper alignment of the equalization steps and via the use of equalization tanks is illustrated using the PSA cycle schedules in FIGS. 1 and 2. The duration of any equalization step or the sum of their durations is not bound to any time restriction. The only restriction that exists in these particular cases is that the duration of the concurrent depressurization, countercurrent depressurization, and light reflux steps together must be equal to that of the light product pressurization step, but the duration of the countercurrent depressurization step and that of the light reflux step are individually independent of each other. For example, the duration of the countercurrent depressurization step of the PSA cycle in FIG. 2 is equal to that of the light reflux step. Thus, the resulting PSA cycle schedules shown in FIGS. 1 and 2, serving only as examples, provide the designer with more flexibility for process design and improvement. In fact, in the boxes to the right of the "N" equalization steps, where all the non-equalization steps reside, except for the feed step, it would now be obvious to anyone skilled in the art that any combination of prior art cycle steps can be included in these boxes depending on the application. For example, there may be no reason to include the light reflux step in the PSA cycle schedules shown in FIGS. 1 and 2.

According to some example embodiments, all or some of the light end equalization steps discussed above could be heavy end equalization steps, wherein the bed-to-bed or bed-to-tank-to-bed gas exchanges could occur through the heavy end of the bed. According to some example embodiments, these light end equalization steps could be cross equalization steps, wherein the bed-to-bed or bed-to-tank-to-bed gas exchanges could occur, for example, from the light end of one bed to the heavy end of another bed or vice versa and also via a tank.

According to some example embodiments, a bed-to-tank-to-bed equalization step is not as effective in removing the lighter species from the bed as is a bed-to-bed equalization step. Example embodiments disclosed herein discuss how to overcome this problem with another embodiment, that is, with the addition of two more coupled cycle steps that are linked together through their light ends. These coupled cycle steps consist of a forced cocurrent depressurization step that takes place after the last of the down equalization steps and a forced intermediary light end pressurization step that takes place after the last of the up equalization steps with the aid of a compressor or vacuum pump. The cycle is such that the compressor or vacuum pump used for this purpose may be the same one that is utilized to pull the heavy product stream from the beds or it may be a different one that is utilized only for this purpose.

Figure 5:
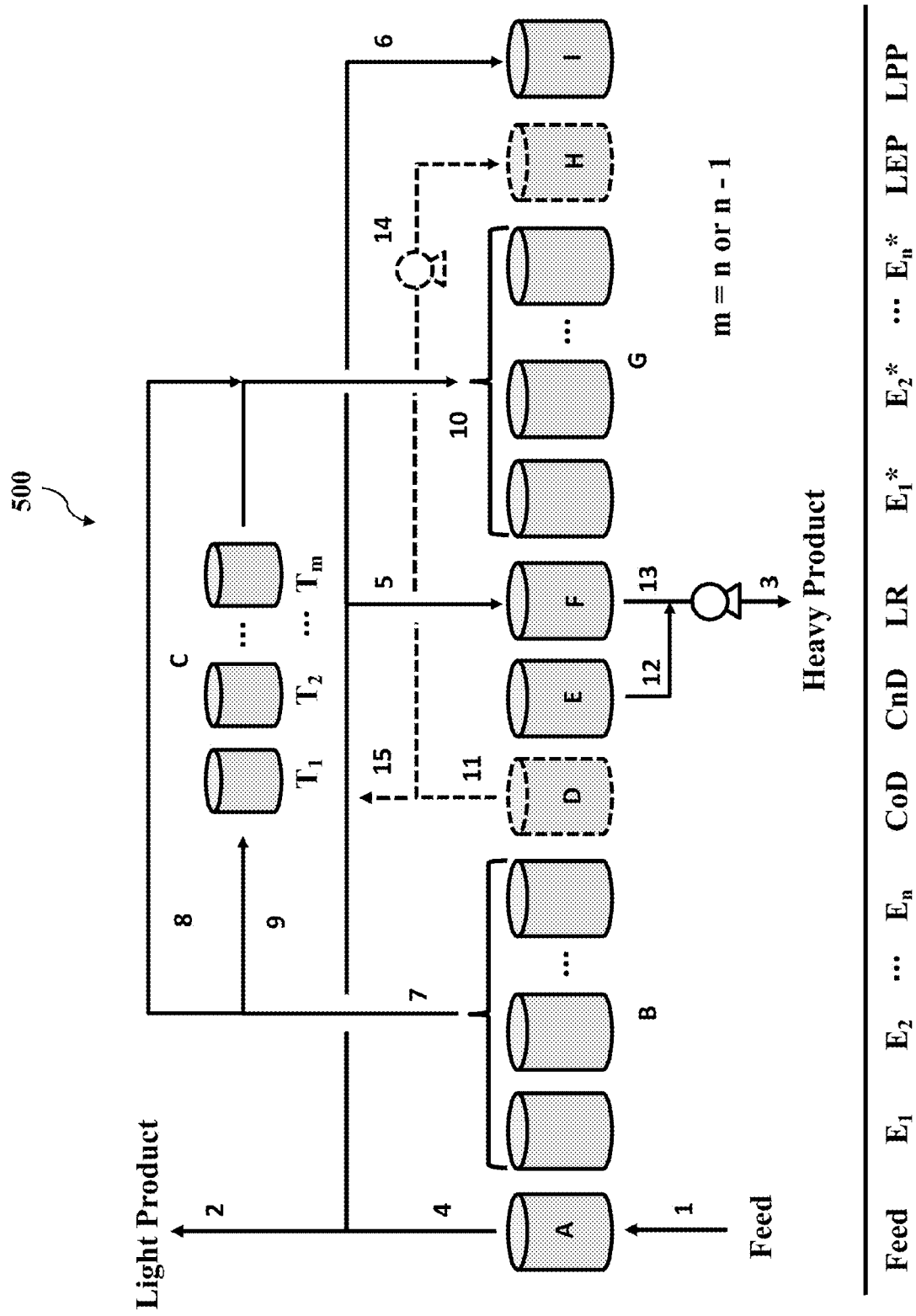
FIG. 5 is a schematic of an example PSA cycle step schedule, according to one or more example embodiments.

FIG. 5 illustrates an example PSA system 500, according to one or more example embodiments. Each step in FIG. 5 occurs in time in going from left to right along the line at the bottom of the figure. The sequence of PSA cycle steps is such that it processes a feed stream (1), thereby producing a light product stream (2) at the light end of a bed that is enriched with the lighter species and at essentially the pressure of the feed stream, and thereby producing a heavy product stream (3) at the heavy (feed) end of a bed that is enriched with the heavier species that leaves a bed at pressures ranging between the feed pressure and the lowest pressure of the cycle, which may be less than atmospheric pressure with the aid of a vacuum pump.

The sequence of PSA cycle steps begins with a Feed step A at the feed pressure, which is also the highest pressure of the cycle, wherein feed (1) is admitted into a bed to produce stream (4) enriched in the lighter species, part of which (2) exits the unit as the light product, part of which (5) is refluxed back to the unit to feed the light reflux (LR) step F and part of which (6) is refluxed back to the unit to feed the light product pressurization (LPP) step I.

The sequence of PSA cycle steps continues with a series of down equalization (E) steps B that continuously reduce the pressure of the bed to deplete it of the lighter species (and hence enrich it with the heavier species) as stream (7) that leaves a bed to feed the corresponding series of up equalization (E*) steps G via stream (10) either directly (8) or indirectly via an equalization tank (9). The process may utilize any arbitrary number of down equalization steps with the same number of corresponding up equalization steps. The number of equalization tanks mediating an equalization step is either equal to the number of down equalization steps or equal to that number minus one. An unlimited number of equalization steps is an example embodiment of this invention.

The sequence of PSA cycle steps may optionally continue with a cocurrent depressurization (CoD) step D to further decrease the pressure in a bed to an arbitrarily designed value thereby further depleting a bed of the lighter species. The gas leaving this bed (11) can be taken as a light product or waste via stream (15) or it can be refluxed back to the unit to feed the LR via stream (6) or it can be used to feed an intermediate light end pressurization step (LEP) H via stream (14) with the aid of a compressor or vacuum pump. This forced and coupled CoD/LEP step is another example embodiment of this invention.

The sequence of PSA cycle steps continues with a countercurrent depressurization (CnD) step E that decreases the pressure in a bed down to the lowest or close to the lowest pressure of the cycle to produce stream (12) that is enriched with the heavier species and taken as part of the heavy product via stream (3).

The sequence of PSA cycle steps continues with a LR step F that operates at the lowest or close to the lowest pressure of the cycle, that receives stream (5) produced from the light end of a bed undergoing the feed step via stream (4), and that produces stream (13) also enriched with the heavier species that is taken as part of the heavy product via stream (3).

The sequence of PSA cycle steps continues with a series of up equalization steps G that correspond to the same series of down equalization steps mentioned previously and that receive stream (10). The pressure of a bed now begins to increase from the lowest pressure of the cycle.

The sequence of PSA cycle steps may optionally continue with the forced intermediate light end pressurization (LEP) step when coupled with the optional forced CoD step mentioned previously via streams (11) and (14). The pressure of a bed increases during this step.

The sequence of PSA cycle steps finishes with the light product pressurization (LPP) step that receives gas via steam (6) that is produced from the light end of a bed undergoing the feed step via stream (4). By the end of this step, the pressure of a bed is back to a value that is equal to or close to the feed step pressure.

According to some example embodiments, the bed undergoing the light reflux step could receive gas from any bed producing gas from its light end as long as its pressure is above the pressure of the receiving bed. According to some example embodiments, the bed undergoing the light product end pressurization step could receive gas from any bed producing gas from its light end as long as its pressure is above the pressure of the receiving bed.

The above sequence of PSA cycle steps can be carried out in such a unique way that it requires only three adsorbent beds, it simultaneously allows continuous feed and production of light product, it incorporates an unlimited number of two or more equalization steps via the use of equalization tanks, it requires no idle steps, it has no dead time, and it provides for significant flexibility with respect to choosing the PSA cycle step durations, all of which foster PSA process performance improvement.

Figure 6:
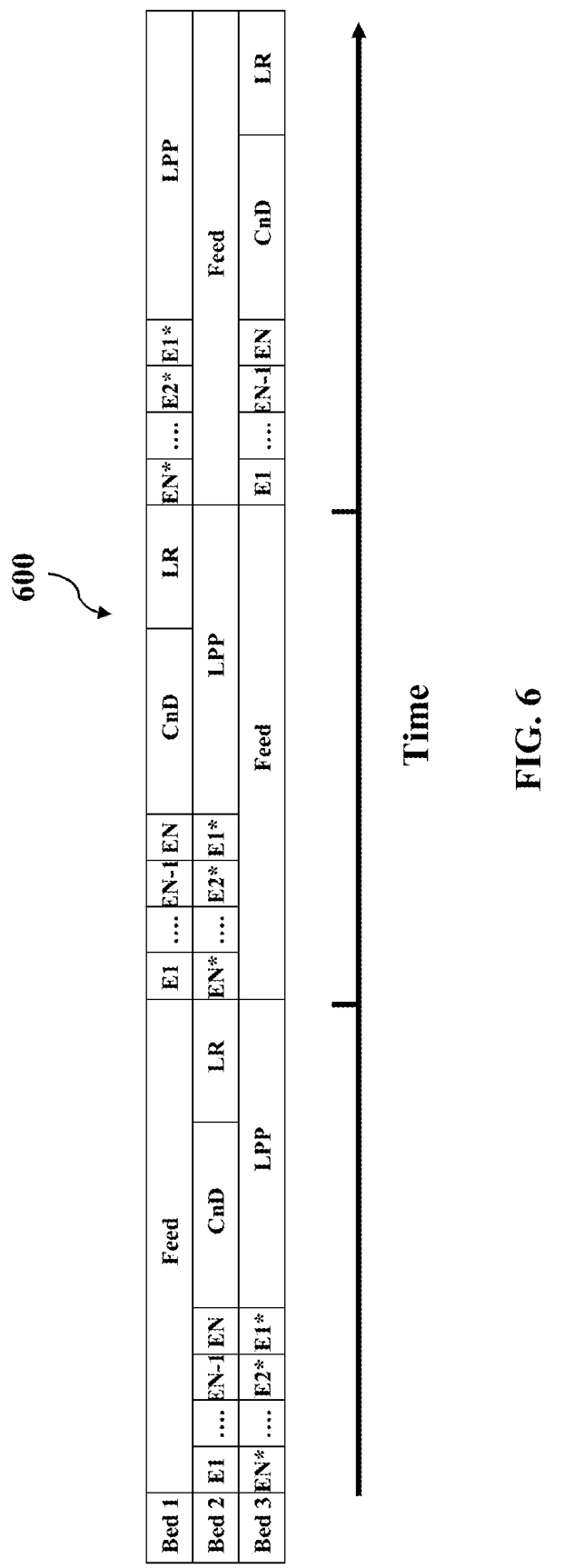
FIG. 6 is a schematic of an example 3-bed, (N+4)-step, N-tank continuous feed PSA cycle schedule with respectively an even number (N) or odd number (N+1) of light end equalization steps and no idle steps and using the preferred PSA cycle step schedule in FIG. 5 but without the coupled and forced countercurrent depressurization and intermediary light end pressurization steps, according to one or more example embodiments.

FIG. 6 shows an example PSA system 600 that is designed specifically for enhanced separation of a feed stream into light and heavy product streams. This PSA cycle schedule consists of three beds, at least two equalization steps, and does not contain a forced cocurrent depressurization step coupled with a forced intermediary light end pressurization step. According to some example embodiments, the unique placement of the "N" equalization steps applies the example embodiments described with respect to FIGS. 1, 2, 3 and 4. If an even number of "N" equalization steps is desired, then all "N" are bed-to-tank-to-bed equalization steps requiring "N" equalization tanks. If an odd number of "N+1" equalization steps is desired, then "N" are bed-to-tank-to-bed equalization steps requiring "N" equalization tanks and one is a bed-to-bed equalization step that necessarily resides in between all the bed to tank to bed equalizations steps with N/2 such steps on either side of it. All the other non-equalization cycle steps except the feed step are necessarily located to the right of the equalization steps, with the countercurrent depressurization (CnD) and light reflux (LR) steps contained in one row (i.e., bed) and the light product pressurization (LPP) step in the other row (i.e., other bed). This unique approach to PSA cycle step arrangement provides the PSA process designer with complete freedom as to how many equalization steps to use, how much time is allotted to them and how time is distributed between the CnD and LR steps, making this a very flexible and unique PSA cycle schedule.

Figure 7:
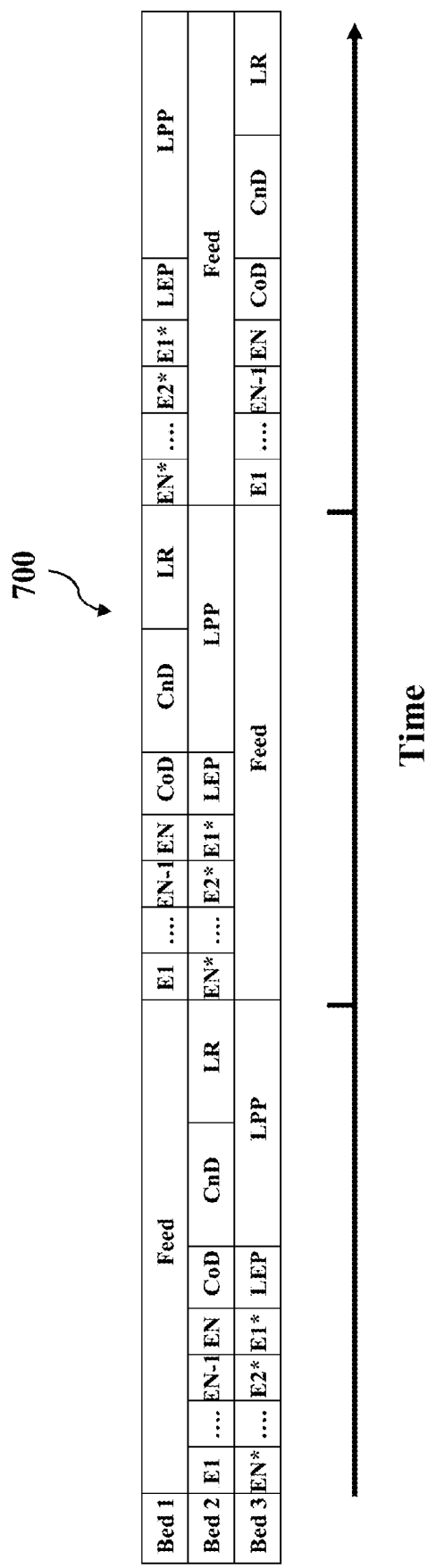
FIG. 7 is a schematic of an example 3-bed, (N+6)-step, N-tank continuous feed PSA cycle schedule with respectively an even number (N) or odd number (N+1) of light end equalization steps and no idle steps and using the preferred PSA cycle step schedule in FIG. 5, but with the coupled and forced countercurrent depressurization and intermediary light end pressurization steps, according to one or more example embodiments.

FIG. 7 shows another example PSA system 700 that is designed specifically for further enhancing the separation of a feed stream into light and heavy product streams. This PSA cycle schedule consists of three beds, at least two equalization steps, and does contain a forced cocurrent depressurization step coupled with a forced intermediary light end pressurization step. The placement of the "N" equalization steps is just like that in FIG. 6, with the same even and odd characteristics. Again, all the other non-equalization cycle steps except the feed step are necessarily located to the right of the equalization steps, but now with the forced cocurrent depressurization (CoD), countercurrent depressurization (CnD) and light reflux (LR) steps contained in one row (i.e., bed) and the forced intermediary light end pressurization (LEP) and light product pressurization (LPP) steps in the other row (i.e., other bed). Notice that the CoD and LEP steps must coincide in time as they are coupled cycle steps. Again, this unique approach to PSA cycle step arrangement provides the PSA process designer with complete freedom as to how many equalization steps to use, how much time is allotted to them and how time is distributed between the CoD, CnD, and LR and LEP steps, making this a very flexible and unique PSA cycle schedule.

According to some example embodiments, the utilization of several equalization steps, and further even, the additional utilization of forced and coupled cocurrent depressurization and repressurization steps, may limit the time duration of both the countercurrent depressurization and light reflux steps to the extent that regeneration of the bed of the heavier species and thus their enrichment in the heavy product stream becomes limited. The present invention teaches how to overcome this problem with another embodiment, that is, by the addition of another adsorption bed that allows for extension of the countercurrent depressurization and light reflux step durations but without affecting the duration of the feed step.

Figure 8:
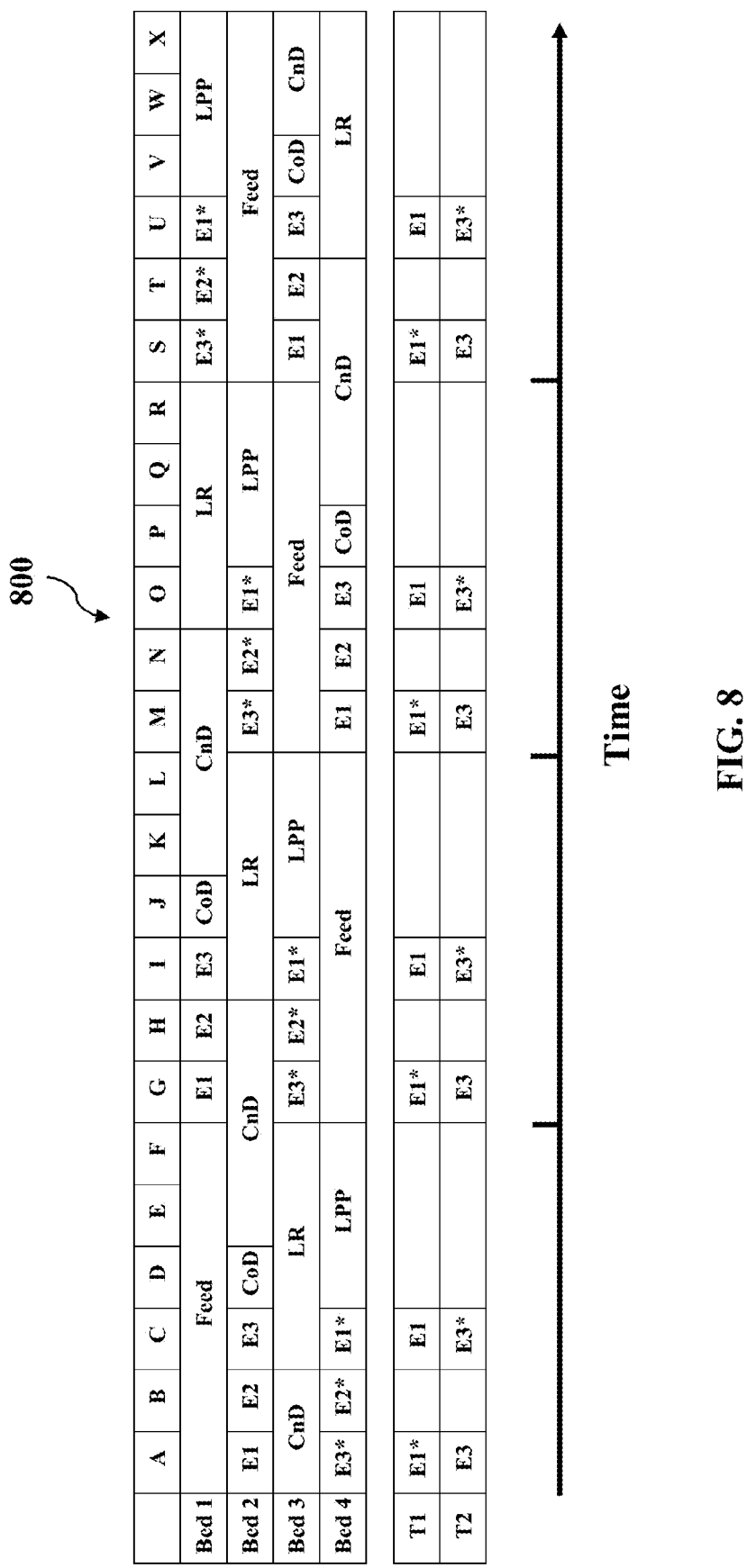
FIG. 8 is a schematic of an example 4-bed, 11-step, 2-tank continuous feed PSA cycle schedule with three light end equalization steps, no idle steps and using the preferred PSA cycle step schedule in FIG. 5, according to one or more example embodiments.

FIG. 8 illustrates this additional embodiment with PSA system 800 that is designed specifically for even further enhancing separation of a feed stream into light and heavy product streams. FIG. 8 provides an exemplary schematic of a 4-bed, 11-step, 2-tank continuous feed PSA cycle schedule that can carry out three light end equalization steps with the mediation of two equalization tanks. This PSA cycle schedule consists of four beds, in this case three equalization steps (it could just as well contain any number of equalization steps with N≥2), and does contain a cocurrent depressurization step and does not contain an intermediary light end pressurization step (but it could just as well contain either or neither of these steps). The placement of the "N" equalization steps is similar to that in FIGS. 6 and 7, with the same even and odd characteristics; however, the additional bed necessarily places a row, that is, a bed in between the equalization down and equalization up steps, as shown. In this case the additional fourth bed is provided to allot further time for the countercurrent depressurization (CnD) and light reflux (LR) steps to facilitate further regeneration of a bed, as shown. According to some example embodiments, the line separating the CnD and LR steps in row 3 (that is, bed 3) can be moved anywhere to the left thereby eliminating it from the row and extending the duration of the LR step or it can be moved anywhere to the right thereby extending its duration to the point where it even eliminates the LR step. This duration change between the CnD and LR steps is independent of the ending time of any other step of the cycle. Again, this unique approach to PSA cycle step arrangement provides the PSA process designer with complete freedom as to how many equalization steps to use, how much time is allotted to them and how time is distributed between the CoD, CnD and LR steps, making this a very flexible and unique PSA cycle schedule.

Accordingly, one example embodiment is a PSA process including providing a PSA apparatus having three beds and two or more equalization tanks, wherein at all times during the process, each of the three beds are continuously and actively separating gases with no idles steps or no dead time.

Another example embodiment is a PSA system including three PSA beds for carrying out a PSA cycle including a plurality of cycle steps, such as feed, equalization down, cocurrent depressurization, countercurrent depressurization, light reflux, equalization up, intermediary light end pressurization, light product pressurization, and two or more equalization tanks, wherein each of the three beds are continuously and actively separating gases with no idles steps or no dead time in the PSA cycle.

Yet another example embodiment is a PSA system including three PSA beds and an even number of N tanks configured to perform a continuous feed PSA cycle schedule with an even number of light end equalization steps (N≥2) and no idle steps and no bed-to-bed equalization steps, wherein N=2, 4, 6, 8, . . . .

Yet another example embodiment is a PSA system including three PSA beds and an even number of N tanks configured to perform a continuous feed PSA cycle schedule with an odd number of light end equalization steps (N–1) and no idle steps and one bed-to-bed equalization step, wherein N+1=3, 5, 7, 9, . . . .

Yet another example embodiment is a PSA system including three PSA beds and an even number of N tanks configured to perform a continuous feed PSA cycle schedule with an even number of light end equalization steps (N) and no idle steps and no bed-to-bed equalization steps, wherein N=2, 4, 6, 8, . . . and including a motive forced cocurrent depressurization/repressurization step to improve the process performance.

Yet another example embodiment is a PSA system including three PSA beds and an even number of N tanks configured to perform a continuous feed PSA cycle schedule with an odd number of light end equalization steps (N+1) and no idle steps and one bed-to-bed equalization step, wherein N+1=3, 5, 7, 9, . . . and including a motive forced cocurrent depressurization/repressurization step to improve the process performance.

Yet another example embodiment is a PSA system including three PSA beds and an even number of N tanks configured to perform a continuous feed PSA cycle schedule with an even number of light end equalization steps (N) and no idle steps and no bed-to-bed equalization steps, wherein N=2, 4, 6, 8, . . . and including at least one additional adsorbent bed to increase the duration of certain PSA cycle steps like the countercurrent depressurization and light reflux steps without affecting the duration of the feed step to improve the process performance and that may or may not include a motive forced cocurrent depressurization/repressurization step to improve the process performance.

Yet another example embodiment is a PSA system including three PSA beds and an even number of N tanks configured to perform a continuous feed PSA cycle schedule with an odd number of light end equalization steps (N+1) and no idle steps and one bed-to-bed equalization step, wherein N+1=3, 5, 7, 9, . . . and including at least one additional adsorbent bed to increase the duration of certain PSA cycle steps like the countercurrent depressurization and light reflux steps without affecting the duration of the feed step to improve the process performance and that may or may not include a motive forced cocurrent depressurization/repressurization step to improve the process performance.

The feed gas streams may include but are not limited to gas species such as ethane, ethylene, propane, propylene, water vapor, ethanol vapor, methane, carbon dioxide, hydrogen sulfide, carbon monoxide, ammonia, sulfur dioxide, nitrogen dioxides, hydrogen, oxygen, nitrogen, argon, etc., each of which may be either the lighter or heavier gas species, depending on the application and adsorbent. The adsorbents in the PSA process may be any of the types commercially or developmentally available including but not limited to molecular sieve zeolites, activated carbons, carbon molecular sieves, silica gels, activated aluminas and metal-organic frameworks (MOFs) with only one type being used or multiple types being used in a layered fashion. The PSA process may be operated between any high and low pressure range including both being above atmospheric pressure or both being below atmospheric pressure or one being above atmospheric pressure and one being below atmospheric pressure. The PSA process may be operated at any temperature including ambient temperature, above ambient temperature or below ambient temperature.

According to example embodiments of this invention the addition of a bed to extend the cycle steps utilized for the production of the heavy product, the 3-bed PSA system becomes a 4-bed PSA system, or even a 5-bed or a 6-bed PSA system. There is no limit to the number of beds that can be added to accommodate increasing the durations of the PSA cycle steps that are utilized for the production of the heavy product in such a way that the feed step duration is not altered. These cycle steps are typically, but not exclusively, the countercurrent depressurization step and the light reflux or purge step. Example embodiments can be implemented still with unlimited and non-restricting equalization steps, no idle steps and no dead time.

The invention claimed is:

1. A pressure swing adsorption (PSA) system comprising:
as few as three PSA beds configured with N-tanks to perform a continuous feed PSA cycle schedule with an even number (N) of light end equalization steps allowing for bed-to-tank-to-bed equalization steps and no bed-to-bed equalization steps, wherein N>2, wherein at all times during the process, each of the three beds are actively separating gases with no idle steps and no dead time, and wherein the system is capable of performing the process with only three PSA beds.

2. The system of claim 1, wherein the PSA cycle schedule for the three PSA beds comprises:
a feed step, an even number of two or more down equalization steps between a bed and a tank, a countercurrent depressurization step, a light reflux step, an even number of two or more up equalization steps between a tank and a bed, and a light product pressurization step.

3. The system of claim 1, wherein all the N equalization steps are in sequence with no other cycle steps in between the N equalization steps.

4. The system of claim 2, wherein the PSA cycle schedule for the three PSA beds further comprises:
a forced cocurrent depressurization step coupled with a forced intermediary light end pressurization step before the countercurrent depressurization step, or a forced intermediary light end pressurization step coupled with the forced cocurrent depressurization step before the light product pressurization step.

5. The system of claim 4, further comprising:
a compressor or a vacuum pump for assisting the forced cocurrent depressurization and forced intermediate light end pressurization steps.

6. The system of claim 2, further comprising:
a fourth bed for extending a duration of the countercurrent depressurization and light reflux steps without affecting a duration of the feed step.

7. A pressure swing adsorption (PSA) system comprising:
three PSA beds configured with N-tanks to perform a continuous feed PSA cycle schedule with an odd number (N+1) of light end equalization steps and one bed-to-bed equalization step, wherein N+1≥3, and wherein at all times during the process, each of the three beds are actively separating gases with no idle steps and no dead time.

8. The system of claim 7, wherein the PSA cycle schedule for the three PSA beds comprises:
a feed step, an odd number of three or more down equalization steps with one between two beds and the rest of the three or more down equalization steps between a bed and a tank, a countercurrent depressurization step, a light reflux step, an odd number of three or more up equalization steps with one between two beds and the rest of the three or more up equalization steps between a tank and a bed, and a light product pressurization step.

9. The system of claim 7, wherein the one bed-to-bed equalization step occurs directly in the middle of the N equalization steps with an equal number of equalization steps on either side of the one bed-to-bed equalization step.

10. The system of claim 8, wherein the PSA cycle schedule for the three PSA beds further comprises:
a forced cocurrent depressurization step coupled with a forced intermediary light end pressurization step before the countercurrent depressurization step, or a forced intermediary light end pressurization step coupled with the forced cocurrent depressurization step before the light product pressurization step.

11. The system of claim 10, further comprising:
a compressor or a vacuum pump for assisting the forced cocurrent depressurization and forced intermediate light end pressurization steps.

12. The system of claim 8, further comprising:
a fourth bed for extending a duration of the countercurrent depressurization and light reflux steps without affecting a duration of the feed step.

13. A pressure swing adsorption (PSA) process comprising:
  providing a PSA apparatus having as few as three PSA beds and two or more equalization tanks; and
  equalizing a pressure of each of the three PSA beds in two or more equalization steps, wherein at all times during the process, each of the three beds are actively separating gases with no idles steps or no dead time, and wherein the apparatus is capable of performing the process with only three PSA beds.

14. The process of claim 13, further comprising:
providing the three PSA beds with N-tanks to perform a continuous feed PSA cycle schedule with an even number (N) of light end equalization steps and no bed-to-bed equalization steps, wherein N≥2.

15. The process of claim 14, further comprising:
a feed step, an even number of two or more down equalization steps between a bed and a tank, a countercurrent depressurization step, a light reflux step, an even number of two or more up equalization steps between a tank and a bed, and a light product pressurization step.

16. The process of claim 15, further comprising:
a forced cocurrent depressurization step coupled with a forced intermediary light end pressurization step before the countercurrent depressurization step, or a forced intermediary light end pressurization step coupled with the forced cocurrent depressurization step before the light product pressurization step.

17. The process of claim 13, further comprising:
providing the three PSA beds with N-tanks to perform a continuous feed PSA cycle schedule with an odd number (N+1) of light end equalization steps and one bed-to-bed equalization step, wherein N+1≥3.

18. The process of claim 17, further comprising:
a feed step, an odd number of three or more down equalization steps with one between two beds and the rest of the three or more down equalization steps between a bed and a tank, a countercurrent depressurization step, a light reflux step, an odd number of three or more up equalization steps with one between two beds and the rest of the three or more up equalization steps between a tank and a bed, and a light product pressurization step.

19. The process of claim 18, further comprising:
a forced cocurrent depressurization step coupled with a forced intermediary light end pressurization step before the countercurrent depressurization step, or a forced intermediary light end pressurization step coupled with the forced cocurrent depressurization step before the light product pressurization step.

20. The process of claim 15, further comprising:
providing a fourth bed for extending a duration of the countercurrent depressurization and light reflux steps without affecting a duration of the feed step.

\* \* \* \* \*